United States Patent
Packingham et al.

(10) Patent No.: US 7,313,525 B1
(45) Date of Patent: Dec. 25, 2007

(54) METHOD AND SYSTEM FOR BOOKMARKING NAVIGATION POINTS IN A VOICE COMMAND TITLE PLATFORM

(75) Inventors: Kevin Packingham, Overland Park, KS (US); Elizabeth Roche, Prairie Village, KS (US); Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 929 days.

(21) Appl. No.: 10/224,077

(22) Filed: Aug. 20, 2002

Related U.S. Application Data (63) Continuation-in-part of application No. 09/964,117, filed on Sep. 26, 2001.

(51) Int. Cl.
G10L 11/00 (2006.01)
G10L 21/00 (2006.01)

(52) U.S. Cl. .................................. 704/270; 704/270.1
(58) Field of Classification Search .................. None
See application file for complete search history.

(56) References Cited

U.S. PATENT DOCUMENTS

| | | | | |
|---|---|---|---|---|
| 5,297,183 | A | 3/1994 | Bareis et al. | 379/59 |
| 5,659,597 | A | 8/1997 | Bareis et al. | 455/563 |
| 5,754,736 | A | 5/1998 | Aust | 395/2.61 |
| 5,915,001 | A * | 6/1999 | Uppaluru | 379/88.22 |
| 6,134,527 | A * | 10/2000 | Meunier et al. | 704/247 |
| 6,157,848 | A | 12/2000 | Bareis et al. | 455/563 |
| 6,501,832 | B1 * | 12/2002 | Saylor et al. | 379/88.04 |
| 6,560,576 | B1 * | 5/2003 | Cohen et al. | 704/270 |
| 6,560,640 | B2 * | 5/2003 | Smethers | 709/219 |
| 6,658,414 | B2 * | 12/2003 | Bryan et al. | 707/9 |
| 6,785,653 | B1 * | 8/2004 | White et al. | 704/270.1 |
| 2003/0014255 | A1 * | 1/2003 | Steingrubner et al. | 704/270 |
| 2003/0032456 | A1 * | 2/2003 | Mumick et al. | 455/566 |
| 2003/0036844 | A1 * | 2/2003 | Balasuriya | 701/201 |
| 2003/0088422 | A1 * | 5/2003 | Denenberg et al. | 704/275 |
| 2004/0205614 | A1 * | 10/2004 | Keswa | 715/523 |

FOREIGN PATENT DOCUMENTS

JP 11184670 A * 7/1999

OTHER PUBLICATIONS

Berners-Lee, "RFC 1630: Universal REsurce Identifiers in WWW", Jun. 1994, Available at: http://www.ietf.org/rfc/rfc1630.txt.*

(Continued)

*Primary Examiner*—David Hudspeth
*Assistant Examiner*—Brian L. Albertalli (57) ABSTRACT

A method and system for identifying saving and utilizing bookmarks in a voice-command platform. The system of the invention provides a user of the voice command platform with a list of bookmark names that are appropriate for the application. Once a user selects a bookmark, the platform may determine that a voice command is a bookmark command, such as a request to save a given voice command navigation point in a centralized list of bookmarks for the user, or to recall a navigation point from the user's centralized list, and the platform may respond to the bookmark command accordingly. The system improves accuracy in the use of bookmarks by proposing bookmark names for a given navigation point that avoid confusion with established grammars.

11 Claims, 2 Drawing Sheets

OTHER PUBLICATIONS

U.S. Appl. No. 09/964,140, filed Sep. 26, 2001, Packingham et al.
U.S. Appl. No. 09/964,117, filed Sep. 26, 2001, Packingham et al.
U.S. Appl. No. 09/964,099, filed Sep. 26, 2001, Packingham et al.
U.S. Appl. No. 09/963,776, filed Sep. 26, 2001, Packingham et al.
Elisa Batista, "Speaking of Voice Recognition", www.wired.com/news/wireless/0,1382,47545,00.html, printed Jul. 26, 2002 (3 pages).
"SALT or VXML?", www.nmscommunications.com/NMS/nmssweb.nsf/pages/SALTVXML, printed Jul. 26, 2002 (2 pages).
Matt Berger, "Industry panel proposes voice standard for Web", www.nwfusion.com/news/2001/1015voice.html, printed Jul. 26, 2002 (6 pages).
"Bookmarks for Voice Command: Presenting the customer with a recommended name", dated Jun. 10, 2002 (3 pages).
"Tellme Studio—Examples", http://studio.tellme.com/library/code/ex-103/, printed Jun. 26, 2001 (4 pages).
"Multilingual WEB sites: Best practice, guidelines and architectures", dated Sep. 2000 (39 pages).
"IBM WebSphere Voice Server Software Developers Kit (SDK) Programmer's Guide, Version 1.5", Second Edition, Apr. 2001 (82 pages).
Ellen Muraskin, "The Portal Pushers: Speech Vendors Poised to Grow The Voice Web", http://www.computertelephony.com/article/printableArticle?doc_id=CTM20001201S0002, printed Jun. 28, 2001 (24 pages).
Eve Andersson, "VoiceXML: letting people talk to your HTTP server through the telephone", ArsDigita Systems Journal, http://www.arsdigita.com/asj/vxml/, printed Jun. 28, 2001 (15 pages).
"New Onebox Solution", Discount Long Distance Digest: The Internet Journal of the Long Distance Industry, http://www.thedigest.com/more/123/123-052.html, printed Sep. 5, 2001 (3 pages).
"Talk To Me: Use Voice Recognition Software For Commands & Dictation", Smart Computing vol. 6 Issue 8 Aug. 2000, http://www.smartcomputing.com/editorial/article.asp?article=articles%2Farchive%2F10608%F09108%F09108%2Easp, printed Sep. 5, 2001 (16 pages).
"Chapter 2: Overview", http://cafe.bevocal.com/docs/grammar/grammar2.html, printed Sep. 5, 2001 (9 pages).
"Preface", http://cafe.bevocal.com/docs/grammar/preface.html, printed Sep. 5, 2001 (2 pages).
"Chapter One: Nuance Grammars", http://cafe.bevocal.com/docs/grammar/gsl.html, printed Sep. 5, 2001 (19 pages).
"<Alias>", http://cafe.bevocal.com/docs/grammar/xml2.html, printed Sep. 5, 2001 (2 pages ).
"<Example>", http://cafe.bevocal.com/docs/grammar/xml3.html, printed Sep. 5, 2001 (1 page).
"<Grammar>", http://cafe.bevocal.com/docs/grammar/xml4.html, printed Sep. 5, 2001, (2 pages).
"<Item>", http://cafe.bevocal.com/docs/grammar/xml5.html, printed Sep. 5, 2001, (2 pages).
"<One-of>", http://cafe.bevocal.com/docs.grammar/xml6.html, printed Sep. 5, 2001, (1 page).
"<Rule>", http://cafe.bevocal.com/docs.grammar/xml7.html, printed Sep. 5, 2001 (2 pages).
"<Ruleref>", http://cafe.bevocal.com/docs.grammar/xml8.html, printed Sep. 5, 2001, (2 pages).
"<Token>", http://cafe.bevocal.com/docs.grammar/xml9.html, printed Sep. 5, 2001, (1 page).
"<Tag>", http://cafe.bevocal.com/docs.grammar/xml9.html, printed Sep. 5, 2001, (1 page).

* cited by examiner

METHOD AND SYSTEM FOR BOOKMARKING NAVIGATION POINTS IN A VOICE COMMAND TITLE PLATFORM

RELATED APPLICATIONS

This application is a continuation-in-part of application Ser. No. 09/964,117, filed Sep. 26, 2001. It is also related to the following commonly owned applications filed on the same date: (i) "Method and System for Dynamic Control Over Voice-Processing in a Voice Command Platform," naming Kevin Packingham, Elizabeth Roche and Terry T. Yu as co-inventors, Ser. No. 09/964,140; (ii) "Method and System for Use of Navigation History in a Voice Command Platform," naming Kevin Packingham as inventor, Ser. No. 09/963,776; and (iii) "Method and System for Consolidated Message Notification in a Voice Command Platform," naming Kevin Packingham and Robert W. Hammond as co-inventors; Ser. No. 09/964,099. The entirety of each of these other applications is hereby incorporated by reference.

BACKGROUND

1. Field of the Invention

The present invention relates to telecommunications and, more particularly, to functions of a voice command platform.

2. Description of Related Art

A voice command platform provides an interface between speech communication with a user and computer-executed voice command applications. Generally speaking, a person can call a voice command platform from any telephone and, by speaking commands, can browse through navigation points (e.g., applications and/or menus items within the applications) to access and communicate information. The voice command platform can thus receive spoken commands from the user and use the commands to guide its execution of voice command applications, and the voice command platform can "speak" to a user as dictated by logic in voice command applications.

For instance, a person may call a voice command platform, and the platform may apply a voice command application that causes the platform to speak to the user, "Hello. Would you like to hear a weather forecast, sports scores, or stock quotes?" In response, the person may state to the platform, "weather forecast." Given this response, the application may cause the platform to load and execute a subsidiary weather forecasting application. The weather forecasting application may direct the platform to speak another speech prompt to the person, such as "Would you like to hear today's weather or an extended forecast?" The person may then respond, and the weather forecasting application may direct the voice command platform to execute additional logic or to load and execute another application based on the person's response.

A robust voice command platform should therefore be able to (i) receive and recognize speech spoken by a user and (ii) provide speech to a user. The platform can achieve these functions in various ways.

On the incoming side, for instance, the platform may include an analog-to-digital (A-D) converter for converting an analog speech signal from a user into a digitized incoming speech signal. (Alternatively, the user's speech signal might already be digitized, as in a voice-over-IP communication system, for instance, in which case A-D conversion would be unnecessary). The platform may then include a speech recognition (SR) engine, which functions to analyze the digitized incoming speech signal and to identify words in the speech. The SR engine will typically be a software module executable by a processor.

Usually, a voice command application will specify which words or "grammars" a user can speak in response to a prompt for instance. Therefore, the SR engine will seek to identify one of the possible spoken responses. (Alternatively, the SR engine may operate to identify any words without limitation).

In order to identify words in the incoming speech, the SR engine will typically include or have access to a dictionary database of "phonemes" (small units of speech that distinguish one utterance from another). The SR engine will then analyze the waveform represented by the incoming digitized speech signal and, based on the dictionary database, will determine whether the waveform represents particular words. For instance, if a voice command application allows for a user to respond to a prompt with the grammars "sales," "service" or "operator", the SR engine may identify the sequence of one or more phonemes that makes up each of these grammars respectively. The SR engine may then analyze the waveform of the incoming digitized speech signal in search of a waveform that represents one of those sequences of phonemes. Once the SR engine finds a match, the voice command platform may continue processing the application in view of the user's spoken response.

Additionally, the SR engine or an ancillary module in the voice command platform will typically function to detect DTMF tones dialed by a user and to convert those DTMF tones into representative data for use in the execution of a voice command application. Thus, for instance, a voice command application might define a particular DTMF grammar as an acceptable response by a user. Upon detection of that DTMF grammar, the platform may then apply associated logic in the application.

On the outgoing side, the voice command platform may include a text-to-speech (TTS) engine for converting text into outgoing digitized speech signals. In turn, the platform may include a digital-to-analog (D-A) converter for converting the outgoing digitized speech signals into audible voice that can be communicated to a user. (Alternatively, the platform might output the digitized speech signal itself, such as in a voice-over-IP communication system).

A voice command application may thus specify text that represents voice prompts to be spoken to a user. When the voice command platform encounters an instruction to speak such text, the platform may provide the text to the TTS engine. The TTS engine may then convert the text to an outgoing digitized speech signal, and the platform may convert the signal to analog speech and send it to the user. In converting from text to speech, the TTS engine may also make use of the dictionary database of phonemes, so that it can piece together the words that make up the designated speech.

Also on the outgoing side, a voice command platform may include a set of stored voice prompts, in the form of digitized audio files (e.g., *.wav files) for instance. These stored voice prompts would often be common prompts, such as "Hello", "Ready", "Please select from the following options", or the like. Each stored voice prompt might have an associated label (e.g., a filename under which the prompt is stored). And, by reference to the label, a voice command application might specify that the voice command platform should play the prompt to a user. In response, the voice command platform may retrieve the audio file, convert it to an analog waveform, and send the analog waveform to the user.

A voice command application can reside permanently on the voice command platform, or it can be loaded dynamically into the platform. For instance, the platform can include or be coupled with a network or storage medium that maintains various voice command applications. When a user calls the platform, the platform can thus load an application from the storage medium and execute the application. Further, in response to logic in the application (such as logic keyed to a user's response to a menu of options), the platform can load and execute another application. In this way, a user can navigate through a series of applications and menus in the various applications, during a given session with the platform.

A voice command application can be written or rendered in any of a variety of computer languages. One such language is VoiceXML (or simply "VXML"), which is a tag-based language similar the HTML language that underlies most Internet web pages. (Other analogous languages, such as SpeechML and VoxML for instance, are available as well.) By coding a voice command application in VXML, the application can thus be made to readily access and provide web content, just as an HTML-based application can do. Further, when executed by the voice command platform, the VXML application can effectively communicate with a user through speech.

An application developer can write a voice command application in VXML. Alternatively, an application developer can write an application in another language (such as Jave, C, C++, etc.), and the content of that application can be rendered in VXML. (For instance, when the platform loads an application, the platform or some intermediate entity could transcode the application from its native code to VXML.)

In order for a voice command platform to execute a VXML application or other tag-based application, the platform should include a VXML browser or "interpreter." The VXML interpreter functions to interpret tags set forth in the application and to cause a processor to execute associated logic set forth in the application.

A VXML application can be made up of a number of VXML documents, just like an HTML web site can made up of a number of HTML pages. A VXML application that is made up of more than one document should include a root document, somewhat analogous to an HTML home page. According to VXML, the root document defines variables that are available to all subsidiary documents in the application. Whenever a user interacts with documents of a VXML application, the root document of the application is also loaded. Therefore, variables defined in the root document should be available during execution of any of the documents of the application.

Each VXML document will include a <vxml> tag to indicate that it is a VXML document. It may then include a number of <form> sections that can be interactive (e.g., prompting a user for input) or informational (e.g., simply conveying information to a user.) Within a given form, it may further include other executable logic.

A VXML document can also define grammars as described above. In particular, VXML grammars are words or terms that the VXML application will accept as input during execution of the application. When a VXML application is executed on a voice command platform, the platform may provide the SR engine with an indication of the grammars that the VXML application will accept. Once the SR engine detects that a user has spoken one of the grammars, the platform may apply that grammar as input to the VXML application, typically proceeding to execute a set of logic (e.g., a link to another document) in response.

For example, a VXML document can define as grammars a number of possible options, as well as a number of possible words that a user can speak to select those options. For instance, a document might define as options of clothing the items "hat", "shirt", "pants" and "shoes". In turn, the document might define the following as acceptable grammars for the "hat" option: "hat", "visor", "chapeaux" and "beret".

Grammars defined in the root document of a VXML application are, by default, available for use in all of the subsidiary documents of the application. Thus, when a voice command platform is executing a VXML application, if a user speaks a grammar that is defined in the root document of the application, the voice command platform should responsively execute the logic that accompanies that grammar in the root document of the application.

In a voice command platform, each navigation point may have a respective identifier or label. For example, each voice command application can have a respective label, such as a network address where the application is maintained. As another example, a voice command application can define a number of successive menus through which a user can browse, and each menu might have a respective label by which it can be referenced. A voice command platform can use these labels to move from application to application or from menu item to menu item, just as hyperlinks operate to cause a browser to move from one web page (or component of one web page) to another.

In VXML, for instance, each VXML document will have a respective Universal Resource Identifier (URI), which is akin to a Universal Resource Locator (URL) used to identify the network location of an HTML page. A given VXML document may thus define logic that instructs the voice command platform to load and execute another VXML document from a designated URI. For instance, a VXML document may indicate that, if a user speaks a particular grammar, the platform should load and execute a particular VXML document from a designated URI, but that, if the user speaks another grammar, the platform should load and execute another VXML document from another designated URI.

An example of a VXML application is a weather reporting application. The weather reporting application may have a root document that includes a tag defining a welcome message and prompting a user to indicate a city or zip code. The root document may further set forth a bundle of grammars that are possible city names and corresponding zip codes that a user can speak in response to the prompt.

When the voice command platform executes this root document, it may thus send the welcome message/prompt to the TTS engine to have the message/prompt spoken to the user. In turn, when the user speaks a response, the SR engine would identify the response as one of the acceptable grammars. The platform would then continue executing the root document in view of the spoken response.

The root document might next prompt the user to indicate whether the user would like to hear today's weather or an extended forecast, and the user would again speak a response. In turn, the root document might indicate that, if the user selects "today's weather," the platform should load and execute a subsidiary document from a designated URI, and if the user selects "extended forecast," the platform should load and execute a different subsidiary document from another designated URI. Of course, many other examples of VXML applications are possible as well.

In most cases, a platform provider will own and operate the voice command platform. Content providers (or independent application developers having a relationship with a content provider for instance) will then provide the VXML applications to be executed by the platform. The platform provider may also provide some applications for the platform and may therefore function as a content provider as well.

Further, a content provider or other application developer can personalize a VXML application, through reference to user profiles. For example, a telecommunications service provider (e.g., local exchange carrier or interexchange carrier) can provide a voice-activated-dialing (VAD) application that allows users to dial a telephone number by speaking a name. To support this feature, the VAD application may direct the voice command platform to prompt a user for a user ID or to determine the user ID based on calling number identification provided when the user's call was connected to the platform. The VAD application may then instruct the platform to call up a personalized VAD application (through use of Microsoft Active Server Pages, for instance), which is tied to the user's personal address book. Each name in the address book may then define an acceptable grammar. When the user speaks one of the names, the application may cause the platform to retrieve a corresponding telephone number and to provide that number to a network switch to facilitate initiating the call.

SUMMARY

The present invention is directed to a method and system for responding to voice commands in a voice-command platform. Generally speaking, the platform receives a voice command during a voice command session with a user, and the platform responsively carries out a set of system-level logic.

For example, the platform may determine that the voice command is an alias-grammar (whether personal to a user, or global for the platform) and may then convert the alias-grammar into an actual grammar. As another example, the platform may determine that the voice command is a bookmark command, such as a request to save a given voice command navigation point in a centralized list of bookmarks for the user, or to recall a navigation point from the user's centralized list, and the platform may respond to the bookmark command accordingly. And as yet another example, the platform may recognize a voice command that is not defined by a voice command application currently being processed but that is instead defined globally for the voice command platform.

Thus, in one respect, the invention may take the form of a voice communication system. The system may include a user communication interface for communicating with users via a telecommunications network, a processor, an application-processing module, a voice-processing module, and aliasing-logic. The application-processing module is executable by the processor to process voice command applications that define allowed grammars and application logic, and the voice-processing module is executable by the processor to recognize grammars in speech signals received from a user via the user communication interface.

In this embodiment, the aliasing-logic is executable by the processor, upon recognition of an alias grammar in a speech signal received from the user, to convert the alias grammar to an actual grammar, and to recognize the actual grammar as an allowed grammar defined by a voice command application.

The aliasing-logic may use a predefined set of correlations between alias grammars and actual grammars to convert between an alias grammar and an actual grammar. Some or all of the correlations may be global for the platform, in the sense that the aliasing-logic uses them substantially regardless of which user is interacting with the platform or which voice command application the platform is processing.

Alternatively, some or all of the correlations may be user-specific and can therefore differ from user to user. In that case, the correlations for a given user might be stored in a user profile record for the user, and the processor may execute a set of personalization-logic to retrieve or read those correlations from the user's profile record during (or, equivalently, at the initiation of—e.g., just before) a voice command session with the user. The platform may further include a set of provisioning-logic (e.g., a web based interface) that can be executed by the processor so as to receive and store correlations from a given user.

In another respect, the invention may take the form of a method of responding to a first grammar spoken by a user to a voice command platform. The user may have accessed the voice command platform by placing a telephone call (e.g., a cellular telephone call or other type of voice call) to the platform. And the method may involve recognizing the first grammar in a speech signal received from the user, converting (or translating) the first grammar into a second grammar, and treating the second grammar as having been spoken by the user.

In this embodiment, the conversion of the first grammar into the second grammar can involve referring to a predefined alias-grammar list to determine that the second grammar correlates with first grammar, and substituting the second grammar for the first grammar. As described above, this can be done globally or on a user-specific basis.

Further, the process of treating the second grammar as having been spoken by the user may involve making a determination that the second grammar is a one defined by (e.g., allowed by) a voice command application being processed by the platform, and then responsively executing a set of application-logic that the given voice command application associates with that grammar.

In still another respect, the invention may take the form of a voice command platform that includes a user communication interface, a processor, an application-processing module, a user profile store, and speech-recognition logic. The application-processing module is executable by the processor to process voice command applications (e.g., VXML applications) that have navigation points (e.g., Universal Resource Identifiers) and that define user-prompts, allowed grammars and application-logic.

The user profile store includes bookmark-data respectively for each of a plurality of users. A given set of bookmark-data for a given user includes a number of bookmark-names each pointing to a respective, corresponding navigation point. In turn, the speech-recognition logic is executable by the processor to recognize a bookmark-name in a speech signal that the platform receives from the given user via the user communication interface.

Thus, the processor uses the given set of bookmark-data to identify the navigation point corresponding to the recognized bookmark-name. And the processor then loads and processes a voice command application that has that navigation point (e.g., a VXML document or application located at a designated URI).

The voice command platform may further include bookmark-saving logic executable by the processor to save a bookmark-name and corresponding navigation point as bookmark-data for a user. In an exemplary arrangement, the bookmark-saving logic can be executable in response to a "Save" command that a user speaks to the platform and that the speech-recognition logic is executable to recognize.

Additionally, the speech-recognition logic can be executable to recognize a bookmark-recall command and a bookmark-name in the speech signal received from the given user via the user communication interface. In response to the bookmark recall command, the processor may then use the given set of bookmark-data to identify the navigation point that corresponds to the recognized bookmark-name, and the processor may then load and execute a voice command application from that navigation point.

In still another respect, the invention may take the form of a bookmark-management method. The method may involve storing, respectively for each of a number of users, bookmark-data that indicates bookmark-names and corresponding pointers to navigation points of voice command applications. The method may then involve receiving from a user, via a telecommunications network, a bookmark-save voice command, and responsively saving as bookmark-data for the user a pointer to a designated navigation point. In turn, the method may involve receiving from a user, via a telecommunications network, a bookmark-recall command designating a given bookmark-name, using the bookmark-data to identify a given navigation point corresponding to the given bookmark-name, and executing a voice command application that is located at the given navigation point.

And in yet another respect, the invention may take the form of a voice command platform that is accessible by users over a telecommunications network. The voice command platform preferably includes (e.g., has access to) a user profile store that indicates, respectively for each of a plurality of users, a set of bookmarks for the user. Each bookmark can advantageously point to a navigation point that is accessible by the platform during a voice command session with the user. In turn, the platform may include logic executable to manage the bookmarks for the user (e.g., to save and recall bookmarks for the user).

In another respect, the invention may take the form of a voice command platform that includes a user communication interface, a processor, an application-processing module, a voice-processing module, and global-grammar logic. The application-processing module is executable by the processor to process voice command applications that define voice prompts, allowed grammars and application-logic, and the voice-processing module is executable by the processor to recognize the allowed grammars in speech signals received from users via the user communication interface.

The global-grammar logic is then executable by the processor to recognize a set of predefined grammars in speech signals received from users via the user communication interface, regardless of which voice command application is currently being executed by the processor. Further, the global-grammar logic may define logic that is associated respecively with each predefined grammar, and the processor may execute that predefined logic in response to recognition of a given predefined grammar spoken by a user.

In still another respect, the invention may take the form of a voice command platform that includes a user communication interface, a processor, a VXML browser, and global-grammar logic. The VXML browser is executable by the processor to process VXML applications, and to communicate speech signals with users via the user communication interface, and the VXML applications define allowed grammars.

The global grammar-logic in turn defines a set of global-grammars that the VXML browser will recognize in speech signals from users, regardless of which VXML application is currently being processed by the VXML browser. The global-grammar logic may be set forth in a root VXML application that the processor references while processing another VXML application. The processor may load and execute such a root VXML application upon initiation of a voice command session with a user.

In this arrangement, when the platform receives a speech signal from a user, the processor analyzes the speech signal to determine whether the speech signal represents one of the allowed grammars defined by the application (e.g., by a current document of the VXML application, or by a root document of the VXML application) and further whether the speech signal represents one of the global-grammars defined by the global grammar logic.

And in still a further respect, the invention may take the form of a method of user-control over a voice command platform. The method may involve receiving a speech signal from a user while processing a voice command application, recognizing in the speech signal a grammar that is not defined by the voice command application, and executing a set of logic associated with the grammar. As such, the grammer could be a global system-level grammar or a personal (user-specific) grammar.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Voice Command System

Figure 1:
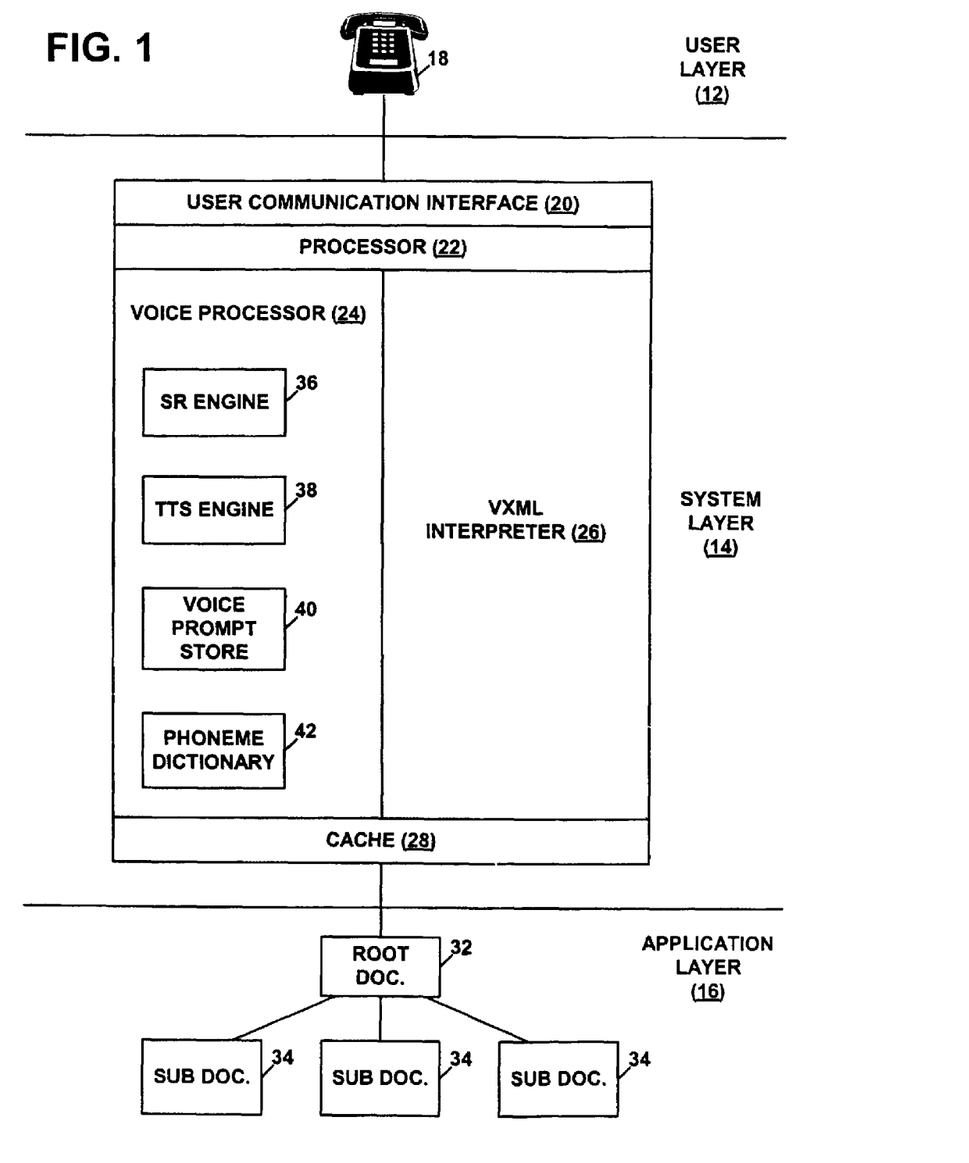
FIG. 1 is a functional block diagram illustrating the layers of a system in which the exemplary embodiments can be employed.

Referring to the drawings, FIG. 1 is a functional block diagram illustrating the layers of a system in which an exemplary embodiment of the present invention can be employed. As shown in FIG. 1, the system may be considered to include three layers, (i) a user layer 12, (ii) a platform or system layer 14, and (iii) an application layer 16. The user layer 12 provides a mechanism 18, such as a telephone, for a person to communicate by voice with the platform. The system layer, in turn, includes a user communication interface 20, a processor 22 (i.e., one or more processors), a voice-processing module 24, a VXML interpreter module 26, and cache 28. Application layer 16 then defines an application 30, which may be made up of a root document 32 and subsidiary documents 34 that can be loaded into cache 28 and executed by processor 22, i.e., by the voice command platform.

User communication interface 20 may take various forms. For example, the user communication interface can provide a circuit or packet interface with a telecommunications network (such as the PTSN or the Internet, either of which may provide connectivity to one or more users via at least one wireless communications link—such as a cellular communication system for instance). The communication interface may, in turn, include an A-D and D-A converter (not shown) as described above, for converting between analog signals on the user side and digital signals on the platform side. Processor 22 then sends and receives communications via user communication interface 20.

Voice-processing module 24 and VXML interpreter module 26 preferably define program instructions that can be executed by processor 22 and data that can be referenced by the processor, to carry out basic voice platform functions. All of this program logic can be stored in suitable data storage, such as ROM or a disk drive for example.

For instance, voice-processing module 24 preferably defines an SR engine 36 and a TTS engine 38, as well as a voice prompt store 40. Further, voice-processing module 24 may include a phoneme dictionary 42 that the processor can reference to facilitate operation of the SR engine and the TTS engine. VXML interpreter module 26, in turn, may facilitate execution of application 30, such as by interpreting tags in the application.

Cache 28 functions to temporarily hold application 30 (or one or more documents of the application) when processor 22 is executing the application. Thus, in operation, processor 22 may retrieve application 30 from a designated URI on the Internet (or elsewhere) and may load the application into cache 28. The processor may then execute the application, using VXML interpreter 26 to interpret tags, using TTS engine 38 and voice prompt store 40 to send speech to a user, and using SR engine 36 to recognize speech spoken by a user.

It should be understood that that this and other arrangements described herein are set forth for purposes of example only. As such, those skilled in the art will appreciate that other arrangements and other elements (e.g., machines, interfaces, functions, orders and groupings of functions, etc.) can be used instead, and some elements may be omitted altogether. Further, as in most telecommunications applications, those skilled in the art will appreciate that many of the elements described herein are functional entities that may be implemented as discrete or distributed components or in conjunction with other components, and in any suitable combination and location.

For example, although the voice command system is shown to include a VXML interpreter, the system may include another type of voice browser. Alternatively, the system might not be browser-based at all. In that event, some of the functions described herein could be applied by analogy in another manner, such as through more conventional interactive voice response (IVR) processing. Other examples are possible as well.

2. Enhanced System Layer

Figure 2:
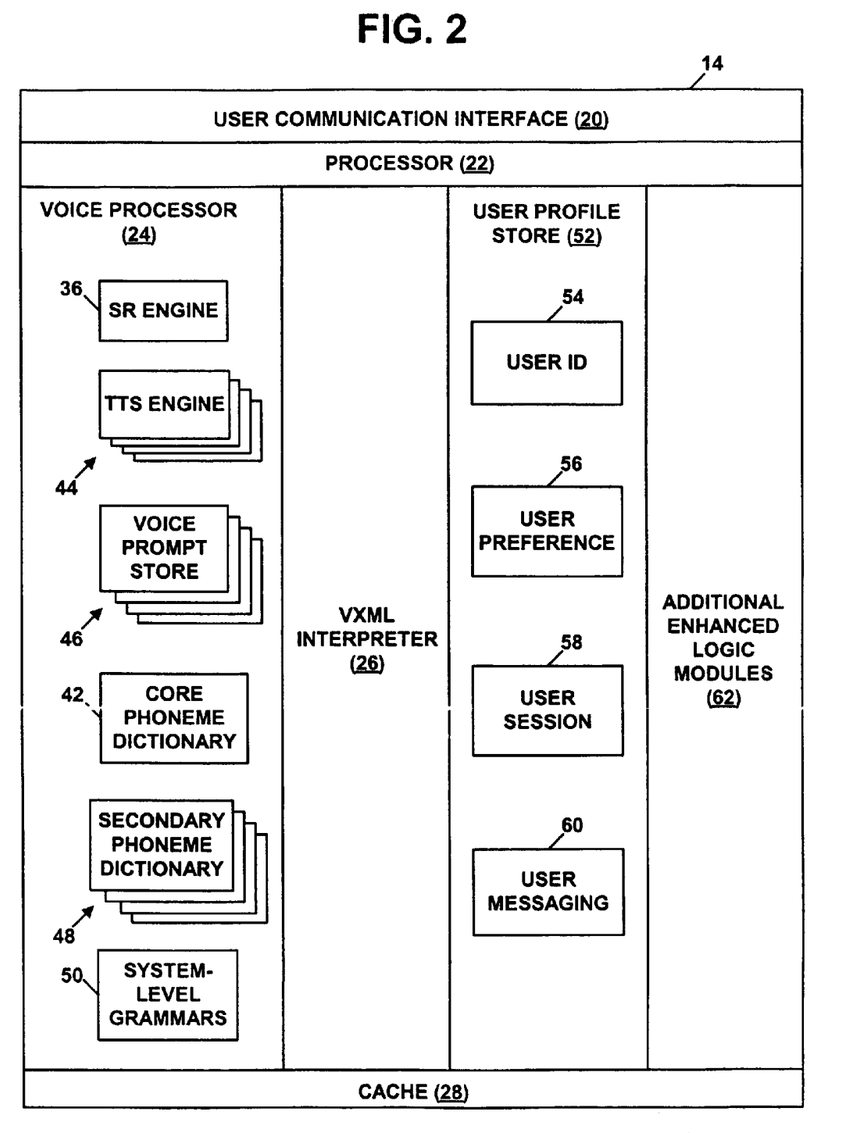
FIG. 2 is a functional block diagram of a voice command platform including enhanced system logic in accordance with the exemplary embodiments.

In accordance with the exemplary embodiment, system layer 14 can be enhanced in several respects, so as to provide a more robust voice command platform. FIG. 2 depicts an expanded functional block diagram of the system layer 14, showing some of the improvements contemplated.

As shown by way of example in FIG. 2, exemplary system layer 14 includes the components described above, such as a user communication interface 20, a processor 22, voice-processing 24, VXML interpreter 26, and cache 28. In addition, according to the exemplary embodiment, the system layer includes or has access to an enhanced set of system logic, preferably comprised of software modules that can be executed by the processor and data that can be referenced by the processor.

Some or all of the enhanced system logic can be co-located with the platform or can be located elsewhere, such as on an accessible network. Further, aspects of this enhanced system logic may be integrated together with the voice-processing module 24 and/or with the VXML interpreter module 26 to any extent desired.

Referring in more detail to FIG. 2, the enhanced system logic can include multiple text-to-speech engines ($TTS_1$, $TTS_2$, ... $TTS_N$) 44 (e.g., separate sub-routines of a main TTS module, or separate TTS modules altogether) that may be selectively applied by processor 22 (i.e., selected by the processor in response to a designated stimulus or instruction). The TTS engines can differ from each other in terms of language (e.g., English, Spanish, etc.), dialect (e.g., accent), voice (e.g., male, female) and/or other aspects, so as to speak to users in different manners. (In the exemplary embodiment, the platform can similarly include multiple speech recognition engines (not shown), or multiple core phoneme dictionaries, to facilitate converting speech of various types to data.)

Additionally, the enhanced system logic can include multiple voice prompt stores or sets of voice prompts 46 that can be selectively applied by the processor. Each prompt set may differ from the other prompt sets in various ways, such as being spoken in different dialects or different voices in a common language, or being spoken in different languages, or with different background music, for instance.

For example, one prompt set might comprise the prompts spoken in a particular celebrity voice (e.g., in a recognizable voice of a particular movie or television star), and another prompt set might comprise the prompts spoken in a different celebrity voice. Still another prompt set might comprise the prompts spoken in a male voice, and another might comprise the prompts spoken in a female voice. Further, another might comprise the prompts spoken in a high energy voice, while another might comprise the prompts spoken in a low key voice. And still another might comprise the prompts spoken in English, while another might comprise the prompts spoken in French.

On the platform, the prompt sets can be stored in separate directories (folders) on a disk drive, where each directory has a respective name to designate the prompt set. For instance, the directories may be named "Celebrity1", "Celebrity2", "male", "female", "high energy", "low key," etc. This can facilitate quick and easy retrieval of desired prompts. Other mechanisms for storing and identifying the various prompt sets, however, are possible as well.

As further shown in FIG. 2, the enhanced system logic can include a set of one or more secondary phoneme dictionaries 48. Each of these secondary dictionaries is preferably an application-specific (or content-provider-specific) phoneme dictionary, provided by a content provider to improve voice processing functions when the platform is executing the respective application.

Additionally, the enhanced system logic can include a set of system-level grammars 50. The system-level grammars 50 are preferably grammars that are defined for the voice command platform generally. As such, the voice command platform can recognize the system-level grammars when spoken by a user at substantially any navigation point, i.e., while any voice command application is being executed by the platform.

In addition, the enhanced system logic can include a user profile store 52. For various aspects of the exemplary embodiment, the user profile store 52 may define (i) user ID information 54, (ii) user preference information 56, (iii) user session information 58, and (iv) user consolidated-messaging information 60. This information can be maintained in a relational database or in any other manner desired (whether as one module or separate objects, such as a meta-directory for instance), and it can be co-located with the rest of the platform or can be located elsewhere.

User ID information 54 may include any information that the platform can use to identify a user, so as to facilitate providing personalized voice command services across multiple applications. In the exemplary embodiment, user ID information will be ANI information, such as the billing number or telephone number of the calling party. Alternatively, however, user ID information can also take other forms, such as username and password.

User preference information 56 can also take various forms. For example, user preference information may include a set of personal grammars/aliases, which define grammars specific to a user. As another example, user preference information may include an expert mode flag (or flags) for the user, which indicates whether or not the platform should interface with the user according to an "expert mode." As still another example, user preference information may include indications of preferred content providers, such as a preferred e-mail provider, a preferred voice-mail provider, a preferred weather-reporting provider, etc.

As yet another example, user preference information may include a set of bookmarks/favorites (with associated names), which function as user-specific shortcuts to URIs or menu items. And as still a further example, user preference information may include a user-specific speech persona, which indicates a voice or persona for the voice-processor to use in communicating to the user (e.g., an indication of which of several possible pre-recorded versions of a prompt to play to the user and/or which TTS engine to use for the user).

User session information 58 can also take various forms. For example, user session information can comprise a record of a user's current session state. In this regard, session state information may include an indication of whether or not the voice-processor (or, more specifically, the speech recognition engine) is currently muted for the user's session. And as still another example, session state information may include an indication of which of the multiple TTS engines 44 and/or voice prompt sets 46 is currently active (selected, or being used) for the user or for the user's session.

User session information 58 can also comprise a record of a user's navigation history. For example, the navigation history record may specify in order the last predetermined number of navigation points (e.g., URIs, menu items, etc.) that the user has accessed, preferably including the latest navigation point accessed by the user. Further, the navigation history record may include a summary ("rollup") indication of the number of times that the user has accessed each navigation point. This navigation history information can be used as a basis to determine whether the system should automatically switch the user to expert mode, as well as to restore a user's voice command session in the event a system disconnect occurs.

User consolidated-messaging information 60, similarly, can take various forms. In the exemplary embodiment, the consolidated-messaging information comprises a summary of the number of messages waiting for the user at multiple separate message portals. For instance, the consolidated-messaging information for a user can indicate a count of voice mail messages waiting for the user at one message portal, a count of e-mail messages waiting for the user at another message portal, and account of fax messages waiting for the user at another message portal. The user profile may also identify each of the user's message accounts (e.g., POP3 e-mail account information, etc.)

As still further shown in FIG. 2, enhanced system logic preferably defines a number of additional logic modules 62 that are executable by the processor to carry out enhanced functions described herein. These enhanced functions can involve, for instance, (a) providing enhanced response to voice commands, (b) allowing dynamic control over the voice-processing module, (c) monitoring and use of navigation history, and (d) providing unified messaging notification.

Some of these functions may involve having processor 22 refer to user profile store 52 in order to determine a user preferences or other user-specific information. In order to facilitate this, a mechanism should preferably be provided to identify a user who contacts the platform. This mechanism can take various forms.

As noted above, for example, user profile store 52 preferably indicates as user ID information each user's ANI. When a user places a conventional telephone call to the voice command platform, the processor can receive the user's ANI in the call setup signaling or otherwise. The processor may then query the user profile store 52 to find the user's profile record. In turn, the processor can store in memory a pointer to the user's profile record. Alternatively, the processor can extract parameters from the user's profile record and store those parameters in memory for quicker access.

As another example, as also noted above, user profile store 52 could indicate a username and password for each user. In an alternative arrangement, the processor could be programmed to prompt a user to specify a username when the user calls the platform, and the processor can then query the user profile store to find a matching record. Further, the processor can prompt the user to specify a password, and the processor can then authenticate the user by reference to the stored password in the profile record.

This alternative identification function can be carried out by having the processor execute a system-level VXML application when a caller calls the platform. The system-level application may define a username voice prompt such as "Welcome to the voice command system. Please state your name to begin." In turn, the system-level application can receive a response spoken by the user and can direct the processor to search the user profile for a matching record.

Each of the exemplary enhanced functions will now be described in the following sections.

a. Providing Enhanced Response to Voice Commands

In accordance with the exemplary embodiment, the enhanced system logic provides for enhanced response to voice commands. Generally speaking, the platform receives a voice command during a voice command session with a user, and the platform then responsively carries out a set of system-level logic.

As examples, enhanced response to voice commands can involve (i) recognizing system-level grammars (i.e., system-specific grammars) that can be spoken by a user, (ii) recognizing personal grammars (i.e., user-specific aliases of other grammars) that can be spoken by a user, and (iii) hosting a set of personal bookmarks (i.e., user-specific shortcuts to navigation points). These examples will be described in the following sections.

i. Responding to User Utterance of System-Level Grammars

Normally, an application that is executed by the voice command platform can define a set of grammars that the system layer will recognize. For instance, a weather reporting application might define "today's weather" and "extended forecast" as grammars that a user can speak, and the application might then define logic to be executed respectively in response to each of those grammars.

In accordance with the exemplary embodiment, as noted above, enhanced system logic 40 can include a set of system layer grammars, which are grammars that the system layer (e.g., VXML interpreter) will recognize globally, i.e., substantially regardless of what application the system is currently executing.

The system-level grammars, and their associated logic, can take various forms. For example, the processor can be programmed to recognize as system-level grammars the terms "Voice Command" and "Main Menu" and to respond to either of these grammars by presenting the user with the initial ready prompt, i.e., the prompt that the user might first encounter when the user calls the platform. As another example, the processor can be programmed to recognize as a system-level grammar the word "Mute" and to respond to this grammar by turning off (or partially turning off) the speech recognition engine 36. Similarly, the processor can be programmed to recognize the word "Unmute" and to respond to this grammar by turning on the speech recognition engine 36.

As still another example, the processor can be programmed to recognize the grammars "Save" and "Bookmark" and to respond to either of these grammars by saving in the user's profile a bookmark to the current navigation point, or by executing a subsidiary bookmark-application. (As will be noted below, the processor may prompt the user to specify a shortcut name for the bookmark, which the processor may also store.) And as yet another example, the processor may be programmed to recognize the grammar "Voice Command Help" and to respond to this grammar by executing a voice command help module/application. Still another example may be a "Pause" or "Go to Sleep" system-level grammar, which may direct the processor to pause the current session.

In the exemplary embodiment, the system-level grammars and their associated logic can be defined in a system-level application that gives the system-level grammars a global scope for subsidiary applications. For example, the SR engine can be hard-coded to recognize the set of system-level grammars. Alternatively, in a VXML-based platform for instance, the system-level application can be a root VXML application that the platform is programmed to run by default when a user calls the platform (preferably without having to be referenced by another VXML document).

The root VXML application can function to welcome the user to the platform, such as by providing an initial ready prompt to the user and providing an initial menu of choices (such as VAD, news, sports, stocks, etc.) and calls to subsidiary applications. And the root VXML application can ideally define the system-level grammars and their associated logic. Thus, as subsidiary applications are called from the root document and from subsidiary documents, the system-level grammars and associated logic defined in the root VXML application will remain available for use in all subsidiary documents.

Preferably, if a content provider defines a grammar in an application that conflicts with (e.g., is the same as) a system-level grammar, the system-level grammar will take precedence. I.e., platform would be programmed to execute the logic defined for the system-level grammar, rather than the logic defined for the conflicting application-level grammar. However, exceptions could be possible.

As another example, the system layer can be programmed with one or more system-level grammars that function as "aliases," i.e., nicknames or shortcuts (or, for that matter, more extensive names) for other grammars. For instance, the system layer might include in memory a table that translates between alias system-level grammars and actual grammars. When a user speaks one of the alias system-level grammars, the system layer can find a match in the table and responsively convert the spoken grammar into the associated actual grammar. The system-layer can then treat the actual grammar as having been spoken by the user.

Advantageously, because this aliasing mechanism exists in the system layer, the voice command platform can provide translations between aliases and actual grammars globally for all applications (or, allowing for exceptions, substantially all applications) executed by the platform. For example, the system-layer might define the terms "weather outlook" and "tomorrow's weather" as alias grammars for the word "extended forecast." In turn, when the system is executing a weather-reporting application and a user speaks "weather outlook," the system may convert "weather outlook" into "extended forecast" and treat "extended forecast" as being spoken by the user. The system may thus execute the logic that the application defines for the response "extended forecast," such as calling up an extended-forecast subsidiary URI, for instance.

ii. Responding to User Utterance of Personal-Grammars

In the exemplary embodiment, as noted above, user profile store 52 can also define a set of user-specific grammars, i.e., personal grammars. In the exemplary embodiment, these personal grammars function as aliases for other grammars, similar to the system-level alias grammars described above.

Thus, a user's profile preferably includes a table or other mechanism that translates between personal grammars and actual grammars. When a user speaks a personal grammar, the system can then find a match in the table and responsively convert the spoken grammar into the associated actual grammar. The system layer can then treat the actual grammar as having been spoken by the user.

As an example, an application may define "stocks" as a grammar that a user can select to go to a stock-reporting application. Advantageously, the user's profile may define the personal grammar "check portfolio" to correspond to the grammar "stocks." When the user speaks "check portfolio," the system can thus translate the grammar into "stocks" and proceed to execute the application as if the user has spoken "stocks." Other examples are possible as well.

iii. Centrally Maintaining Personal Bookmarks

In accordance with the exemplary embodiment, as noted above, user profile store 52 can further include, for each user, a set of one or more bookmarks that function as user-specific shortcuts to navigation points, such as URIs or menu items. Advantageously, by maintaining these bookmarks centrally on the voice command platform (or otherwise in a manner accessible by the platform), a user can make use of the bookmarks when the user calls the platform from any location (absent other restrictions).

Preferably, the enhanced system logic provides a mechanism for maintenance of these bookmarks, such as recording the bookmarks, receiving user requests to use the bookmarks, and applying the bookmarks to navigate to a designated navigation point. In the exemplary embodiment, this can be accomplished through a system-level application (e.g., a VXML application) that a user can access by speaking a system-level grammar such as "Bookmark," i.e., the platform can be arranged to execute a bookmark-management application in response to the system-level grammar "Bookmark."

An exemplary bookmark-management application can provide a user with options such as (i) Save the current URI, (ii) Recall a bookmark, and (iii) Edit a bookmark. In response to user selection of the Save option, the bookmark-management application may direct the processor to save in the user's bookmark list the URI of the VXML document that the user was accessing before the user called the bookmark-management application (or the label of whatever other navigation point the user was accessing at the time). Further, the bookmark-management application may direct the processor to prompt the user for a shortcut name (i.e., an alias) for the bookmark, possibly providing the user with a list of suggested names. Once the user speaks the name or agrees to use a name from the list, the processor may store the name in the user's bookmark list together with the URI.

The use of names from a list proposed by the system has the advantage of avoiding the user selecting a bookmark term that may easily be confused with an existing grammar. Such confusion could lead to recognition inaccuracy. Thus, there is an advantage with the system presenting the user with options that do not interfere with existing grammars thereby preventing recognition inaccuracies. In one method, the content provider provides the proposed bookmark names. In the normal course of designing a VXML application and the associated VXML documents, the content provider will append tags to the documents. Generally, each URI has certain elements or tags associated with it that provide functionality to the document and can assist the browser when referencing the document. These tags can include multiple functions that allow the user to access the document. One of these tags would be set up to contain suggested bookmark names. If the document is written pursuant to the proposed SALT (Speech Applications Language Tags) specification, as opposed VoiceXML, the Bookmark Tag could be established in the same manner. Indeed, such tags can be established in any XML based system.

By way of example, a "Book_mark" element or tag may be provided. The "Book_mark" tag may have several functions including "URI", "List_grammar", "Actual_grammar" and "Status_codes." The "URI" function contains the URI associated with the voice site that the user would like to bookmark. The "List_grammar" function provides a list of suggested names for bookmarks. The list of names is separated by a "|" so that the system can parse the various choices. The "Actual_grammar" function enables different grammars based on the name chosen by the user. In other words, it associates the "List_grammar" selected by the user with the actual grammar input by the user. This association of grammars allows for more accurate recognition and improves the user experience. Finally, the "Statue_codes" function defines unique error or messages that provide feedback to the content provider.

Thus, in this embodiment, the VXML application may provide the user with the option of bookmarking the application. If the user invokes the option, for example by saying the word "bookmark", then the application will reference the "Book_mark" tag to provide the user with a list of proposed bookmarks. The user then selects a bookmark from the list by saying the term.

In another exemplary embodiment, existing tags as defined in the VoiceXML 2.0 draft or the SALT specification may be utilized to supply a list of proposed bookmark names. Both VoiceXML 2.0 draft and the SALT specification define meta elements that provide information on the associated document. Information that is typically included in these meta elements include things like, author, copyright, description, keywords and the like. In a similar fashion, according to the exemplary embodiment, a "bookmarks" option could be created within the meta elements. This option will enable the content provider to provide a list of recommended bookmark names as part of the meta information. An example of such use of the meta elements is set forth below:

<?xml version="1.0">

<vxml version="2.0">

<meta name= "Author" content= "John Doe"/>

<meta name= "Bookmarks" content= "Headlines| Headline News | CNN Headline News"/>

. . . .

</vxml>

In this manner, the document can be the source of a list of bookmarks design to avoid confusion with existing grammars and facility the user interfacing with the system.

In a further effort to improve the accuracy of bookmark recognition, the system may also include functionality that compares an elected bookmark name with existing bookmark names and grammars to ensure there is no confusion. In one example, once the user identifies a bookmark name the system provisionally accepts the bookmark name. However, before entering the bookmark name into the user profile, the system compares the provisionally accepted bookmark name with the existing bookmark names and grammars. If there is no conflict, then the bookmark name is finally accepted and added to the user profile. If, however, the system identifies a conflict with existing bookmark names or grammars the system may then prompt the user to select another bookmark name. Another example may have the system checking for conflicts before it presents the list of suggested bookmark names to the user. Specifically, the system after retrieving the list of suggested bookmark names from the application may compare the suggested list against the existing bookmark names and grammars in the user profile. If the system identifies a conflict, the conflicting bookmark name from the proposed list will not be presented to the user. There are other examples that can function individually or in combination to minimize potential conflict between bookmark names and the associated potential inaccurate recognition.

Once a bookmark is established, in response to user selection of the Recall option the bookmark-management application may direct the processor to prompt the user to speak the name of a bookmark on the user's list. Once the user speaks the name, the processor may refer to the bookmark list to determine the corresponding URI and may then load the document from that URI and execute the document.

As a further enhancement, the bookmark-management application may direct the processor to recognize the command "Recall" followed by the name of the bookmark that the user wants to recall, and to responsively load and execute the corresponding URI. For instance, in response to a user speaking "Recall Shopping," the bookmark-management application may direct the processor to refer to the user's bookmark list to find a URI that corresponds to the name "Shopping." The processor may then find the corresponding URI and load and execute the URI. (Note that the "Recall URI" grammar structure can itself be made a system-level grammar of the voice command platform, so that a user can call up a stored URI at any time, without first expressly calling up the bookmark-application.)

In response to user selection of the Edit option, the bookmark-management application may direct the processor to prompt the user to speak the name of a bookmark on the user's list. The processor may then prompt the user to indicate whether the user wants to rename or delete the entry. Other examples are possible as well.

b. Allowing Dynamic Control Over the Voice-Processing Module

In accordance with the exemplary embodiment, the enhanced system logic also provides for dynamic control over the voice-processing module. Generally speaking, according to this embodiment, the voice-processing module 24 may have a number of selectable modes of operation. During a voice command session with a user, the platform may then receive a specification that corresponds with a mode of operation of the voice-processing module. In response to the specification, the processor 22 will cause the voice-processing module 24 to operate according to the mode of operation corresponding to the specification.

Advantageously, the platform may receive the specification from various sources. For example, the platform may receive the specification from a user during the voice command session (e.g., the user can speak the specification or enter the specification through DTMF key entry). As another example, the platform may receive the specification from a voice command application being processed during the voice command session (e.g., the application can command the platform to switch to a particular voice-processing mode). As still another example, the platform can retrieve the specification from user profile store 52 (e.g., at the initiation of the voice command session (where "during" could be just before the platform answers a call from a user, for instance)).

Further, the particular voice-processing mode or change of voice-processing mode may also take various forms. For instance, in response to the specification, the platform might (i) mute the SR engine 36, (ii) selectively apply a designated text-to-speech engine, (iii) selectively apply a particular voice prompt store, (iv) selectively apply a particular speech persona, and/or (v) selectively apply a designated secondary phoneme dictionary. Examples of these enhancements will be described in the following sections.

i. Muting the SR Engine

In an exemplary voice command platform, processor 22 is programmed to be able to selectively turn on or off the SR engine 36. When the SR engine is turned off, the system will not recognize words spoken by the user or will recognize only very specific grammars (or a limited set of grammars). For instance, the SR engine may be set to simply not analyze incoming digitized speech waveforms, or the SR engine may be set to analyze only the digitized speech waveforms in search of only very specific grammars.

Advantageously, enhanced system logic 40 enables a user to control the state of the speech recognition engine during the user's session with the voice command platform. As described above, for instance, a system-level grammar such as "Mute" can be defined. When the user says "Mute," the processor may respond by setting a flag in memory to indicate that the SR engine is turned off. The SR engine module 36 may then include logic to indicate that, if the flag indicates the SR is turned off, the processor should not apply the SR engine module or should apply only designated aspects of the module.

In the exemplary embodiment, the user can then turn the speech recognition engine back on for the user's session, by entering a designated DTMF tone that the processor is programmed to recognize. Alternatively, when the speech recognition engine is off, the processor can be programmed to recognize only the word "Unmute" as a command to cause the processor to turn back on the SR engine. For instance, the word "Unmute" can be a system-level grammar. Further, when the SR engine is off, it can still function to await the word "Unmute."

With this enhancement, a user can thus disable the speech recognition engine whenever the user wants to do so. For instance, if a user is listening to a long news story and is standing in a noisy airport, the user can say "Mute" to prevent a "barge-in" error such as where the background noise is erroneously recognized by the speech recognition engine. Advantageously, the word "unmute" is uncommon enough that it is not likely to be spoken unless a user intends to turn back on the SR engine.

ii. Using an Application-Specific Phoneme Dictionary

As noted above, the system layer traditionally includes or has access to a core phoneme dictionary 42, which defines phonemes that the voice-processor 24 can use in performing speech recognition. This dictionary thus enables the voice command system to recognize words spoken by a user.

A problem with this arrangement, however, is that the core dictionary might not define all of the possible utterances that users may make in connection with applications executed by the platform. For instance, a mapping application might include as grammars a list of street names and city names, many of which might have unconventional pronunciations. In order for the voice command platform to be able to interface with a user, the platform should ideally be able to understand utterances that are specific pronunciations unique to the content provider or application. At the same time, a platform provider should not have to overhaul its core dictionary in order to be compatible with all possible applications.

To overcome this problem, as noted above, then enhanced system logic can include one or more secondary phoneme dictionaries 48, each of which can be associated with a particular application (e.g., a particular URI or other navigation point) and/or a particular content provider. In the exemplary embodiment, each secondary phoneme dictionary can be a uniquely named data file that defines additions to the core dictionary, such as additional phonemes that the processor should recognize when executing the SR engine 36. For instance, the secondary dictionary associated with one application might be named "Phoneme_46", while the secondary dictionary associated with another application might be named "Phonome_47".

Thus, when the processor executes an application, the processor can determine whether the application has an associated secondary dictionary 48. If so, the processor can apply that secondary dictionary 48 in conjunction with the core dictionary 42 as the processor executes the SR engine 36.

To associate each secondary phoneme dictionary with an application, the voice command platform can include or have access to a translation table or other logic that indicates, for a given application, which secondary phoneme dictionary to use. The table or other logic can be set up to correlate a given application with a given secondary phoneme dictionary and/or to correlate all applications by a given content-provider with a given secondary phoneme dictionary. Further, the table can correlate more than one secondary dictionary with a given application. Thus, to determine whether an application has an associated secondary phoneme dictionary, the processor can refer to the translation table or other logic.

The voice command platform can obtain secondary phoneme dictionaries in various ways. In the exemplary embodiment, for instance, a content-provider or other entity can provide the voice command platform with a secondary phoneme dictionary to be used for a given application (or applications).

For example, the content provider can provide the secondary phoneme dictionary in advance, i.e., before the platform loads and executes the application. Alternatively, an application can include a secondary phoneme dictionary as a component that the platform will load when the platform loads the application. (This can be similar to how a browser loads a graphic or other component when it loads a conventional HTML web page.) The enhanced system logic will then cause the processor to load the secondary dictionary, store the secondary dictionary for use during execution of the application, and use the secondary dictionary. In the latter scenario, the processor can be programmed to delete the secondary dictionary when the processor finishes executing the application, or the processor can maintain the secondary dictionary for use again next time the application is executed.

iii. Applying User-Specific Designation of Speech Persona

According to the exemplary embodiment, as noted above, user profile store 52 can indicate for each user a user-specific persona. A user-specific persona defines a voice facade by which the platform will present itself to the user. As such, the persona could define a specific TTS engine (of TTS engines 44) and/or voice prompt store (of voice prompt stores 46) that the platform should apply when it speaks to the user. Other aspects of a user-specific speech persona are possible as well. For instance, a given user's speech persona may dictate a particular tone and/or pitch for the TTS engine to use when generating analog speech signals.

The persona is user-specific, in that the platform could use one persona when interacting with one user and a different persona when interacting with another user. In the exemplary embodiment, the user profile record for a given user can include a table or other indication that identifies a TTS engine and/or voice prompt set to use during sessions with the user and that may further indicate other parameters about the way that the speech should be presented to the user. Further, the persona designation can define more complex persona-selection logic, such as that the platform should use one persona when interacting with the user at one time (e.g., daytime) and a different persona when interacting with the user at another time (e.g., evening).

The persona designation for a given user may point specifically to a TTS engine and/or voice prompt set, or it may point more generally to a persona that the platform should use. For example, the persona designation may indicate the name of a particular TTS engine (e.g., as "English_tts", "Spanish_tts", "male_tts", "female_tts", etc.) and/or the label of a particular voice prompt directory (e.g., "Celebrity_1", "Celebrity_2", "male", "female"). Alternatively, the persona designation may indicate more generally a persona category, in which case the processor may refer to a stored translation table that indicates which TTS engine and/or voice prompt set to use so as to achieve the designated persona.

Further, the voice of the prompt set and the voice of the TTS engine can be made to approximate or match each other (e.g., both can be English speaking male voices of roughly the same pitch), so that a user profile record can indicate a TTS engine and the platform can select a corresponding voice prompt set (and vice versa). To do so, the platform can be programmed with system-level logic (e.g., a cross-reference table) that matches voice prompt sets with TTS engines and that indicates parameters such as pitch.

Thus, when a user calls the platform, processor 22 can programmatically consult user profile store 44 to determine which persona is to be used for speaking to the user. As the processor then executes an application for the user, the processor may then apply the designated TTS engine and/or voice prompt set. Further, the platform can have a default persona (e.g., a standard "male" persona), which the processor can be programmed to use when the user's profile does not indicate that the platform should use another persona.

In the exemplary embodiment, a platform can also allow a user to change the user's persona selection mid-session. For instance, by speaking a system-level grammar such as "Change Persona", the user could direct the platform to execute a persona-management application. The persona-management application can tell the user which persona is currently set for the user and can prompt the user to select a different persona. In response to user-selection of a different persona, the processor can update the user's profile record accordingly and can begin to use the different persona.

Advantageously, a user-specific speech persona can be tailored to separately suit each particular user. For instance, a female user might prefer a female voice TTS engine and a corresponding female voice prompt set, while a male user might prefer a male voice TTS engine and corresponding mail voice prompt set. Other examples are possible as well.

iv. Applying a Voice-Processing Mechanism Designated by an Application

In the exemplary embodiment, the enhanced system logic also enables an application to specify which of various voice-processing mechanisms the platform should use during execution of the application. For instance, the logic can enable an application to specify which of multiple TTS engines 44, voice prompt stores 46 and/or secondary phoneme dictionaries 48 to use during execution of the application.

To facilitate this, each voice-processing mechanism can have a unique identifier, and the processor can be programmed to recognize and respond to an instruction (e.g., a predefined command, tag, etc.) in an application that specifies the use of a particular voice-processing mechanism. Each such instruction may, for instance, indicate a voice-processing type and a voice-processing value.

For example, as noted above, exemplary TTS engines might be named "English_tts", "Spanish_tts", "male_tts", "female_tts", etc., exemplary voice prompt stores might be named "Celebrity_1", "Celebrity_2", "male", "female", etc., and exemplary phoneme dictionaries might be named "Phoneme_46" and "Phoneme_47". Exemplary VXML tags to specify a voice-processing mechanism might then take the following form:
 <TTS = "Spanish_tts">
 <VOICEPROMPT = "Celebrity_1">
 <PHONEME = "Phoneme_46">

An application can be written to include one or more of these tags. And the VXML interpreter 26 can then be written to recognize these tags and to direct the processor to apply the designated voice-processing mechanism.

Further, the platform can include or have access to a translation table or other logic that correlates unique voice-processing keys (e.g., code numbers) with designated voice-processing mechanisms. According to that table, a given voice-processing key could be correlated with a specific TTS engine 44, a specific voice prompt store 46 and/or a specific secondary phoneme dictionary 48. For instance, voice-processing key "3752" can be correlated with a combination of the "male_tts" TTS engine and the "male" voice prompt store.

A suitable instruction in an application can then specify a particular voice-processing key, such as by a VXML tag like the following:

<VOICEPROC = "3752">

In turn, the VXML interpreter can be written to recognize such a tag and to direct the processor to apply the corresponding voice-processing mechanism(s).

With the exemplary arrangement, a content-provider can thus write a voice command application to take advantage of the ability to dynamically select a voice-processing mechanism that the platform should use. For instance, a given application may include a voice-processing tag at the start of its root document, which will direct the platform to apply a particular TTS engine, a particular voice prompt store and/or a particular secondary phoneme dictionary during execution of the application.

Further, by including a voice-processing tag in an application, the application can cause the platform to switch between voice-processing mechanisms dynamically during execution of the application. For instance, the application may cause the platform to switch from one TTS engine to another during execution of the application.

In the exemplary embodiment, the voice command platform will preferably be programmed to treat particular voice-processing mechanisms as default mechanisms, in the event no other designation is made. For example, the default setting may be to use the "English_tts" TTS engine, the "female" voice prompt store, and no secondary phoneme dictionary. Other examples are possible as well.

Finally, another way for an application to specify a voice-processing mechanism to use is for the application or content-provider to provide the platform with the voice-processing mechanism. As noted above, for example, the application or content-provider can provide the platform with a secondary phoneme dictionary 48. Further, since the TTS engines 44 and voice prompt stores 46 are also preferably software-based, it would be possible for an application or content-provider to similarly provide the platform with an application-specific TTS engine and/or voice prompt store to use during execution of the application.

c. Monitoring and Use of Session Information

According to another aspect of the exemplary embodiment, the enhanced system logic also provides for maintaining and using information concerning user sessions with the voice command platform. In one respect, this functionality thus involves maintaining user session information. And in another respect, this functionality then involves using the session information to enhance user interaction with the platform in some manner. By way of example, two enhancements that a user's session information can facilitate are (1) automatically transitioning a user to expert mode based on the user's navigation history, and (2) automatically restoring a session that was abruptly cut off by a system disconnect or other event.

The process of maintaining user session information and using the information to perform these exemplary functions will now be described.

i. Maintaining User Session Information

As noted above, user profile store 52 can include a record of user session information, such as current session state information as well as user navigation history. In the exemplary embodiment, the processor 22 is preferably programmed to maintain this session information for each user, i.e., to keep track of each user's session with the platform.

In terms current session state information, for instance, the processor may be programmed to record in the user profile an indication of whether or not the speech recognition engine 36 is muted for a given user's session, as well as an indication of which TTS engine and/or voice prompt set is currently active for the user's session. These parameters can be set as flags or other parameters in the user's profile record.

In terms of navigation history, the processor may be programmed to maintain a list of the URIs accessed by the user, beginning with the most recent. In addition, as noted above, the processor may maintain a summary table that indicates, for each URI, how many times the user has accessed the URI. The processor may thus increment an entry in the summary table each time a user accesses the same URI.

Further, the processor may also be programmed to maintain in the user profile a record of how many times each user has contacted the voice command platform, possibly together with indications of the dates and/or times that the user has contacted the platform.

ii. Automatically Transitioning a User to Expert-Mode, Based on Navigation History Generally speaking, a voice command application can define a number of voice prompts, acceptable response grammars, and associated logic that the platform is to execute in response to particular responses or other events. Thus, as a user interacts with the voice command application, the platform would present designated voice prompts to the user, receive responses from the user, and carry out logic keyed to the responses or other events.

A user who interacts regularly with the same application, however, may tire of listening to the same voice prompts over and over, and having to regularly provide the same response grammars to each voice prompt. To enhance the user experience, a robust voice command application can therefore define multiple sets of voice prompts, acceptable response grammars and/or associated logic.

As an example, one set might be considered a standard set, which would be appropriate for interaction with the typical user. And another set might be considered an expert set, which would be appropriate for interaction with a user considered to be an expert. Thus, depending on whether the user who is interacting with the voice command application is designated as an expert user or not, the application may then instruct the processor to apply either the standard set or the expert set.

An expert set of voice prompts and/or acceptable response grammars may be more streamlined than the standard set, such that a user can more quickly navigate. For instance, when a given application is going to prompt a user to select between a number of choices, a standard voice prompt might be a full statement of the list of choices followed by a closing voice prompt such as "Please state your response now." In contrast, an expert voice prompt at the same navigation point might be a scaled down version of the list of choices and/or a shorter closing voice prompt such as "Ready." Alternatively, the expert voice prompt might omit portions of the standard voice prompt in their entirety and might substitute a short tone or other mechanism to solicit a response.

As a specific example, at a given navigation point in a weather reporting application, the weather reporting application might define as a standard voice prompt the words, "If you would like to hear today's weather, please say 'today.' If you would like to hear an extended forecast, please say 'extended.' Please speak your response now." And at the same navigation point, the weather reporting application might define an expert voice prompt, "Today or Extended?" followed by a quick prompting tone. Depending on whether the user who is currently interacting with the application is designated as an expert or not, the application may then instruct the platform to apply either the standard prompt or the expert prompt.

In accordance with the exemplary embodiment, a given user can be designated as either a standard-mode user or an expert-mode user. (Other such designations or use-levels are also possible. For instance, a user could be a beginner, intermediate or advanced user.) Further, for a given user, different use-level designations can be specified for different navigation points. For instance, a user may be designated as a standard-mode user for a particular application (e.g., a particular URI), and the user may be designated as an expert-mode user for another application or for a particular navigation point within an application.

Preferably, the user profile store 52 will include an indication, per user, of a use-level, such as whether or not the user is an expert-mode user. If a user is globally designated as an expert mode user for all applications that the voice command platform executes, the user's profile record may include a flag that indicates the user is an expert-mode user. Alternatively, if the user is designated as an expert-mode user for some navigation points and a standard-mode user for others, then the user's profile record can include a table that indicates, per navigation-point, whether the user is an expert-mode user. The table may, for instance, list URIs (and/or other navigation point labels) and, for each URI, provide a flag indicating whether the user is an expert-mode user.

At a given navigation point in a voice command application, the application can then include logic that instructs the processor to apply a standard-mode prompt if the user is a standard-mode user or to apply an expert-mode prompt if the user is an expert-mode user. In response to that logic, the processor may consult the user profile store to determine whether or not the user is an expert-mode user. If the user is an expert-mode user, the processor may then apply the expert-mode prompt. And if the user is a standard-mode user, the processor may apply the standard-mode prompt.

In accordance with the exemplary embodiment, as noted above, the enhanced system logic further includes a mechanism to automatically switch a user from standard mode to expert mode, either generally or for specific navigation points. The transition to expert mode can occur based on any designated event or combination of events.

For example, as noted above, the processor can be programmed to review a user's navigation history and to automatically transition a user to expert mode after the user has accessed a particular navigation point, particular navigation points, and/or the voice command platform generally, more than a threshold number of times. The processor may perform this review each time a user calls the voice command platform, or at other designated times.

This logic can be as simple or as complex as desired. For instance, the logic could direct the processor to switch a user to expert mode for a given navigation point after the user has accessed the navigation point at least 10 times. Alternatively, the logic could direct the processor to switch a user to expert mode for a given application once the user has accessed the application at least 20 times and has accessed at least two second level navigation points in the application. Other examples are possible as well.

In the exemplary embodiment, when the processor determines that the user should be transitioned to expert mode, the processor could prompt the user with an announcement indicating the benefits of the transition and requesting the user's consent to the transition. Alternatively, the processor could perform the transition without asking the user for consent. Further, the processor could perform the transition even when the user is offline, such as at nighttime when the platform might have more available processing power.

It should be further understood that the processor can also transition a user more granularly through use-modes, rather than just transitioning between two modes (such as a "standard" (not-expert) mode and an "expert" mode). For instance, the expert-mode transition logic might operate to slowly transition a user to more of an expert mode as the user interacts more with the platform. In this sense, transitioning a user from standard mode to expert mode could be interpreted to mean transitioning the user from any use-mode (which might be considered "standard" to a more advanced use-mode (which might be considered "expert"), even though other modes may exist as well.

As an example, the more the processor executes a given set of VXML prompt logic when interacting with a given user, the more abbreviated the prompts may become (as defined by graduated levels of logic in the application, keyed to a use-level set for the user, for instance). The first time, the processor might present a long tutorial prompt to the user. The second time, the processor might present a detailed version of the voice prompt. The 10th time, the processor might present a more abbreviated version of the voice prompt. And the 25th and later times, the processor might present the user with only a tone prompt.

iii. Using Session Information to Help Restore a Session After System Disconnect As noted above, the enhanced system logic can also facilitate restoring a user to where the user left off in a voice command session, when a session ends abruptly. This can occur, for instance, if the user's telephone connection to the platform gets cut off (e.g., as a result of a coverage drop, signal fade, hang-up or out-dialed call), if the system encounters an error that causes the session to be dropped, or in other instances.

In the exemplary embodiment, when a system disconnect occurs, the processor will preferably maintain an indication of the disconnect for a period of time (e.g., approximately 15 minutes) in user profile store 52, together with an indication of the user's navigation points and perhaps other session information at the moment of the disconnect. Provided that the platform keeps a log of the navigation points that the user has accessed, as described above, the user's latest navigation point could be the most recent navigation point in that log.

When a user calls the platform, the processor may be programmed to consult the user's profile record to determine whether a system disconnect occurred during a session with the user. If the processor determines that a system disconnect occurred, the processor may then prompt the user to indicate whether the user wants to resume where the user left off or, rather, whether the user wants to begin from the start. After the user responds, the processor then either loads and executes an application where the user left off or begins a voice command session normally.

For example, during a session with the voice command platform, a user may be navigating through a set of driving directions. Preferably, the content provider has arranged each step in the driving directions at a separate URI (where one URI leads to the next). When the user navigates to step 5 of the driving directions, the processor may record the URI of step 5 in the user's navigation history, preferably together with a name of the navigation point (e.g., "Step 5 of driving directions"). At that point, a system disconnect might occur. (For instance, the user might intentionally disconnect only to return later to get later steps of the directions.) The processor may then record a flag or other indication in the user profile, indicating that a system disconnect occurred (e.g., in response to the fact that a normal logoff sequence did not occur, or based on any other suitable logic), and noting the time of the disconnect.

When the user then calls back the platform, the processor may consult the user's profile and determine that a system disconnect occurred. In response, the processor may programmatically prompt the user to indicate whether the user wants to resume where the user left off. For instance, based on the user's navigation history, the processor may identify the navigation point that the user most recently visited and may then prompt the user accordingly, such as "Say 'Step 5' to resume Step 5 of the Driving Directions or say 'Voice Command' to start over." Once the user responds, the processor may then either load the associated URI.

d. Providing Unified Message Notification

According to the exemplary embodiment, user profile store 52 can include a consolidated summary of the number of messages waiting for the user at multiple separate message portals, and the processor can be programmed to provide a consolidated or unified message notification to the user. This function can thus involve (i) maintaining consolidated message waiting information for a user and (ii) providing the consolidated notification to the user.

In order to maintain consolidated message waiting information, the platform provider will preferably receive update messages from various message portals (e.g., an e-mail portal, a voice mail portal, a fax portal, an instant messaging portal, etc.), indicating the number of messages waiting for the user at each message portal. To accomplish this, a user may register with various message portals to authorize the message portal to report message-waiting counts to the voice command platform (or to an intermediate entity that functions to store and forward the information to the voice command platform). The various message portals will then send update messages to the voice command platform, autonomously or in response to requests (e.g., periodic requests) from the platform.

Preferably, the update messages that each portal sends to the voice command platform will be in a predetermined standard format that processor 20 is programmed to recognize. For instance, each update message could be an IP-based message that includes an XML indication of parameters such as (i) message portal name, (ii) user ID (e.g., the user's message portal ID or, more preferably, the user's voice command platform ID), and (iii) priority (e.g., standard, urgent, etc.) As an example, a message from a publicly available e-mail portal might specify that the user has 4 messages of urgent priority waiting at that portal, while a message from a private corporate e-mail portal might specify that the user has 2 messages of standard priority waiting at the corporate e-mail system.

Each portal can be programmed to send such an update message to the voice command platform each time the number of messages waiting for the user at the portal changes and/or upon request from the platform. For instance, once a user reads or hears a message that was waiting at a given message portal, the message portal may decrement the number of messages—waiting by one and send an update message to the voice command platform.

In the exemplary embodiment, processor 20 is then programmed to receive the update message count per user from each of multiple message portals and to responsively update the user's profile record with a current summary of the number of messages waiting at the various portals. For instance, the user profile record might include a table that lists various message portals, the type of each portal, and the number of messages (of various priority levels) waiting for the user at the given portal. The processor can thus readily update the table in response to each new update message that it receives from a message portal.

When a user calls the platform, and/or at another designated time during a session with the platform, the processor preferably provides the user with a consolidated message notification, based on the summary maintained in the user profile. The consolidated message notification will indicate to the user how many messages are waiting for the user to retrieve from at least two different message portals. For instance, a system-level root VXML application can welcome the user to the platform and can then announce to the user the number of messages waiting for the user at the various portals. The system-level application may carry out this function before or after providing the user with an initial Ready prompt.

The user may then opt to browse to the designated message portals so as to have the messages read to the user. For instance, if the user has messages waiting in a particular e-mail system (e.g., at a given corporate e-mail server), the user may command the platform to load that system's e-mail application (e.g., an application referencing that corporate e-mail server), which may function to read the user's e-mail messages to the user.

In the exemplary embodiment, the user profile store 52 can include for each user a respective notification profile record that establishes user-specific features of the consolidated message notification. For example, a user's notification profile might establish user-specific names for each of the user's message portals, and the platform may use those names when presenting the consolidated message notification to the user. For instance, a user's profile record might designate a particular e-mail portal as "work e-mail" and another e-mail portal as "home e-mail." When the platform presents the consolidated notification to that user, the platform may report to the user that the user has "3 messages waiting in your work e-mail account and 8 messages waiting in your home e-mail account" for instance.

As another example, a user's notification profile can establish what information the consolidated message notification should include and how the information should be presented. For instance, a user's profile record might indicate that the consolidated notification should summarize messages in categories (such as by level of priority or importance for instance). Further, the user's profile might indicate that the consolidated notification should be filtered in some manner, such as by summarizing only those messages designated as urgent, or only those messages originating from a particular sender, for instance.

Still further, the information provided in the consolidated message notification can vary depending on the type of message portals involved. For instance, if the user has an e-mail account, a fax account and an instant message account, the consolidated notification could present the user with counts of messages waiting at these three accounts as well as indications of (i) the number of pages included respectively in each fax message and (ii) the identities of the user's instant message "buddies" who are currently online. Other examples are possible as well.

3. Provisioning

In the exemplary embodiment, a provisioning system may be established so as to allow users to set up and manage their profiles. For instance, a provisioning server may be provided on the Internet and may function as an intermediary between the voice command platform and users. As such, the provisioning server may have real-time access to the user profile store 52 and may function to validate data (e.g., user-specified changes to profile records) before writing them to the profile store.

A user may connect with the provisioning server from a web browser on a client computer. Once connected, the user would log in (e.g., by providing a user ID, which the provisioning server would match with a profile record), and the provisioning server would then present the user with a consolidated summary of the user's profile record. The consolidated summary may include information such as: (i) the persona and/or default TTS engine designated for the user, (ii) a list of the user's personal-grammars and their corresponding actual grammars, (iii) the user's expert mode state, (iv) the user's navigation history, (v) a list of the user's bookmarks and (vi) the user's consolidated messaging summary. The provisioning server may then permit the user to modify some or all of this information via the web interface.

In addition, the provisioning server may function as an interface through which content providers can provide the voice command platform with secondary phoneme dictionaries. Preferably, a content provider would log in, and the provisioning server would then allow the content provider to upload or modify secondary phoneme dictionaries and associations with applications. The provisioning server may then store the secondary dictionaries on the voice command platform or elsewhere to be accessed and used by the platform.

4. Conclusion

Exemplary embodiments of the present invention have been described above. Those skilled in the art will understand, however, that changes and modifications may be made to these embodiments without departing from the true scope and spirit of the invention, which is defined by the claims. In particular, the present invention has been principally described as an implementation as a platform in the VoiceXML language. It will be understood that it is equally as applicable in other XML based languages, including the Speech Application Language Tags (SALT) proposed standard.

What is claimed is:

1. A voice command platform comprising:
a user communication interface for communicating with users via a telecommunications network;
a processor;
an application-processing module executable by the processor to process voice command applications, the voice command applications having navigation points, and the voice command applications defining user-prompts, allowed grammars, application-logic and lists of suggested bookmark-names for the voice command application;
a user profile store including bookmark-data respectively for each of a plurality of users, wherein the bookmark-data for a given user includes a number of bookmark-names each pointing to a respective, corresponding navigation point associated with a voice command application;
a module comparing a proposed bookmark-name of the user with existing bookmark-names and grammars to determine a potential speech recognition conflict with the proposed bookmark-name; and
speech-recognition logic executable by the processor for recognizing a bookmark-name in a speech signal received from the given user via the user communication interface;
wherein the processor uses the given set of bookmark-data to identify the navigation point corresponding to the recognized bookmark-name, and the processor then loads—and processes a voice command application that has that navigation point; and
wherein each of a plurality of the navigation points are Universal Resource Identifiers.

2. The voice command platform of claim 1, wherein the telecommunications network comprises the public switched telephone network.

3. The voice command platform of claim 1, wherein the telecommunications network comprises a wireless communications link.

4. The voice command platform of claim 1, wherein the processor loads a voice command application from the navigation point corresponding to the recognized bookmark-name and then processes the voice command application.

5. The voice command platform of claim 1 where the stored bookmark data includes bookmark-names from the suggested lists of bookmark-names provided by various voice command applications.

6. The voice command platform of claim 1, further comprising:
bookmark-saving logic executable by the processor to save a bookmark-name and corresponding navigation point as bookmark-data for a user.

7. The voice command platform of claim 6, wherein the bookmark-saving logic is executable by the processor in response to a bookmark save command that a user speaks to the voice command platform.

8. The voice command platform of claim 1, wherein:
the speech-recognition logic is executable by the processor to recognize a bookmark-recall command and a bookmark-name in the speech signal received from the given user via the user communication interface; and
in response to the bookmark recall command, the processor uses the given set of bookmark-data to identify the navigation point corresponding to the recognized bookmark-name and the processor then loads and executes a voice command application from that navigation point.

9. A bookmark-management method comprising:
proposing a list of bookmark-names for a voice command application;
comparing the proposed list of bookmark-names against existing bookmark names and grammars established by a user and stored in a user profile store;

receiving from a user, via a telecommunications network, a selection of a bookmark-name from the proposed list of bookmark-names;

storing bookmark-data indicating the selected bookmark-name and the corresponding pointer to a navigation point of a voice command application in the user profile store; and receiving from a user, via a telecommunications network, a bookmark-recall command designating a given bookmark-name;

using the bookmark-data to identify a given navigation point corresponding to the given bookmark-name; and executing a voice command application that is located at the given navigation point;

wherein the given navigation point comprises a Universal Resource Identifier.

10. The bookmark-management method of claim 9, wherein the method is executed by a processor on a voice command platform.

11. A voice command platform accessible by users over a telecommunications network, the voice command platform comprising voice command applications wherein at least one said applications provide the user with a list of multiple suggested bookmark-names for the application, and a user profile store that indicates, respectively for each of a plurality of users, a set of bookmarks for the user, each bookmark pointing to a navigation point that is accessible by the platform during a voice command session with the user, wherein the navigation points comprise Universal Resource Identifiers.

* * * * *